UNITED STATES PATENT OFFICE.

EUGEN SCHILZ, OF JOHANNESBURG, SOUTH AFRICAN REPUBLIC.

CYANID PROCESS OF EXTRACTING PRECIOUS METALS FROM THEIR ORES.

SPECIFICATION forming part of Letters Patent No. 696,274, dated March 25, 1902.

Application filed June 27, 1899. Serial No. 722,092. (No specimens.)

*To all whom it may concern:*

Be it known that I, EUGEN SCHILZ, a subject of the Emperor of Germany, residing in Stone street, Jeppestown Extension, Johannesburg, in the South African Republic, have invented certain new and useful Improvements Relating to the Cyanid Treatment of Reduced Ores to Extract the Precious Metals Therefrom, of which the following is a specification.

My invention relates to an important improvement in the extraction of precious metals from their ores by means of cyanid solution, so that the extraction is augmented more than ten per cent.

The fact that gold is soluble in a solution of cyanid of potassium and water has long been known, and it has been equally as long known that flaky gold, such as will float on the surface of such a cyanid solution—*i. e.*, in contact with the atmospheric air (oxygen)—will be dissolved more rapidly than when it is entirely submerged in such solution—*i. e.*, excluded from the air. This fact is taken practical advantage of in the so-called "double-treatment" system generally adopted, in which the tailings after several days treatment in the so-called "top" vat are transferred to the bottom vat, and thereby given an opportunity of becoming saturated with air—that is, oxygen.

The importance of the part played by oxygen in the cyanid process having been fully demonstrated, many experiments have been made with a view to replacing atmospheric oxygen by the addition of oxidizing bodies, but, as would appear, without result. Gold mines have thus been compelled to abandon residues containing sometimes from four to seven pennyweights of gold, which has remained undissolved even after being treated with cyanid solution for a fortnight. This insolubility is due to the fact that the gold is contained in pyrites, and therefore inaccessible to the action of cyanid of potassium, which does not act on pyrites. Before cyanid solution can act upon this class of ores a medium is required which will free the gold from the pyrites—*i. e.*, which will act upon the pyrites so as to allow the cyanid to come into contact with the gold. "Nascent oxygen," as it is called, or oxygen generated in direct proximity to the bodies on which it is about to act accomplishes this end, and it is a well-known fact that it oxidizes sulfur, which is the insoluble component of pyrites. The insoluble pyrites are thus transformed into soluble sulfates of iron oxid and in this manner permit the cyanid solution to act.

The object of my invention is to supply oxygen in a nascent state to the tailings about to be treated by adding a substance having a powerful base and rich in oxygen and which is at the same time free from the possible disadvantage of the oxidized sulfur exercising a decomposing effect upon the cyanid-of-potassium solution.

The word "tailings" as used in this description is understood to mean reduced ore and as such includes "concentrates," "sand," "slimes," &c.

My invention consists in adding peroxid of barium (anhydrate) ($BaO_2$) and intimately and thoroughly mixing the same with the tailings before subjecting them to the treatment of cyanid solution. Barium peroxid ($BaO_2$) has the property when in contact with auriferous ores of rapidly decomposing and producing oxygen gas. This oxygen not only assists the cyanid in dissolving the gold, but at the same time converts the insoluble pyrites into soluble sulfate-of-iron oxid, ($Fe_2O_3 3SO_3$.) This soluble sulfate-of-iron oxid which has been formed is in its turn decomposed by the presence of monoxid of barium. Free iron oxid and sulfate of barium are thus formed, both of which substances are difficult of dissolution in water and remain in the tanks, greatly to the benefit of the cyanid solution. Thus

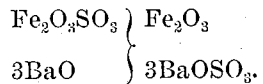

Peroxid of barium soon decomposes when in contact with moistened tailings, becoming monoxid of barium and oxygen—that is, it develops free oxygen.

Prior to the date of the discovery of my process it was proposed when using barium peroxid in connection with the cyanid treatment of gold ores to liberate or separate the oxygen from the barium peroxid by means of heat or by the use of an acid—such, for instance, as sulfuric acid; but it was not known previous to my discovery that finely-divided gold produces the same result as that attained by the use of heat or an acid—that is to say, decomposes $BaO_2$ into $BaO+O$. As above set forth, I have discovered that barium peroxid has an affinity for gold, that in connection with auriferous reduced ores it is decomposed into $BaO+O$ without the aid of an acid or heat, and that in carrying out my process the use of heat or an acid is neither necessary nor desirable.

I may also mention the fact that the barium monoxid performs a function of great importance in the cyanid solutions. These solutions receive a thorough purification from this strong base—barium monoxid—and it is especially the sulfur and sulfocyanid compounds upon which it acts, and thereby prevents the injurious effects of the same. By thus exerting a purifying and clearing influence upon the cyanid solutions the solving power of the same is greatly increased. The solutions in the "sump" lose color and the titrate becomes more pronounced and distinct. Besides, BaO makes the use of lime quite superfluous. Lime has the bad quality of blocking the cast-iron pipes, especially those of the slimes plant. Lime dissolves more readily and freely in cold than in hot water. A cold solution of lime therefore deposits lime along the hot surface of, for instance, a pipe which has been exposed the whole day to the rays of the sun. BaO, on the contrary, dissolves more readily in hot than in cold water. Therefore the blocking of pipes is less likely to occur. In mines where lime is still used the pipes through which the solution flows should at least be protected and isolated from the sun.

In the so-called "double treatment" an opportunity is presented for employing my method of applying the barium peroxid to the tailings. These tailings at the time when they are removed from the top vat to the bottom vat are besprinkled with the barium peroxid. It is both important and desirable in order to obtain the results sought for that this barium peroxid should be thoroughly and intimately mixed with the tailings, and in order to obtain the most favorable results care should be taken to see that the distributed quantity of powder is in proportion to the tailings. This powder may be distributed among the tailings in any preferred manner, the main point being the very frequent distribution of the same to obtain a thorough mixing of it with the said tailings. To secure the best results, the bottom of the lower vat should receive a relatively greater quantity of the powder. Care should be taken that the vat is not filled to the brim, as barium peroxid works somewhat after the manner of yeast, and the contents might thus be caused to overflow the vat.

The mode of application as described above is, however, simple enough, especially in the case of mines which adopt "dry" crushing and direct cyanid treatment.

As regards the quantity of peroxid of barium to be applied it will be sufficient to use from half a pound to a pound to a ton of ordinary tailings, coarse sands, and slimes in order to obtain in a much shorter space of time a more complete extraction of the gold than was possible by previously-adopted methods.

Concentrates and residues of concentrates will require from about two to four pounds of peroxid of barium per ton. It will be necessary to tightly close up the charge mixed with peroxid of barium for three days in a strong solution of cyanid of potassium in order to allow the oxygen which is being developed time to act on the pyrites and free gold.

The following experiment will demonstrate the chemical and physical action of peroxid of barium on tailings: Mix one pound of tailings with about one hundred and fifty grains of peroxid of barium and cover with cyanid solution. After a few hours bubbles of gas will rise to the surface, which may be demonstrated to be oxygen by the application of a glowing splinter, which will burst into flame. The volume of the mass also becomes enlarged, and (particularly in the case of slimes) its internal structure will be seen to resemble a sponge. Peroxid of barium acts on moistened tailings in much the same way as yeast in dough.

Having now described my invention, what I claim as new, and desire to secure by Letters Patent, is—

An improved process in the art of extracting precious metals from their ores, said process consisting in thoroughly and intimately mixing peroxid of barium ($BaO_2$) with precious-metal-bearing material, substantially as and for the purposes set forth, and then subjecting the same to treatment with an alkaline cyanid solution.

In witness whereof I have hereunto set my hand in presence of two witnesses.

EUGEN SCHILZ.

Witnesses:
WILLIAM J. ROBSON,
D. LEWIS WOOLF.